United States Patent [19]
Schutte

[11] Patent Number: 5,568,985
[45] Date of Patent: Oct. 29, 1996

[54] MIXER APPARATUS HAVING AN IMPROVED STEADY BEARING

[75] Inventor: Marlin Schutte, Rochester, N.Y.

[73] Assignee: General Signal Corporation, Stamford, Conn.

[21] Appl. No.: 329,592

[22] Filed: Oct. 26, 1994

[51] Int. Cl.[6] .................................................. F16C 33/76
[52] U.S. Cl. ........................................................ 384/478
[58] Field of Search .................................. 384/607, 478, 384/132, 133, 134

[56] References Cited

U.S. PATENT DOCUMENTS

| | | |
|---|---|---|
| 3,762,052 | 10/1973 | Melde . |
| 3,957,403 | 5/1976 | Sloan . |
| 4,565,453 | 1/1986 | Jekat et al. . |
| 4,588,361 | 5/1986 | Saulgeot ..................................... 384/478 |
| 4,770,549 | 9/1988 | Rokkaku et al. . |
| 4,799,810 | 1/1989 | Gilbert . |
| 4,932,787 | 6/1990 | Fasano . |
| 4,934,837 | 6/1990 | Kawamura . |
| 4,997,296 | 3/1991 | Narita . |
| 4,997,324 | 3/1991 | Shirai . |
| 5,069,603 | 12/1991 | Stueber . |
| 5,088,832 | 2/1992 | Gambrill et al. . |
| 5,163,757 | 11/1992 | Graham . |

*Primary Examiner*—Lenard A. Footland
*Attorney, Agent, or Firm*—M. Lukacher

[57] ABSTRACT

The improved steady bearing contains a trap at the distal end of a mixer shaft in a vessel whereby the steady bearing is isolated from materials being mixed. The steady bearing is preferably a dry-running ceramic ball bearing assembly. A hood on the mixer shaft defines a cavity open downward in communication with the interior of the vessel within which cavity the steady bearing is disposed. The cavity is provided with a process fluid, preferably a gas, at a pressure equal to or greater than the hydrostatic pressure of the materials being mixed outside the hood, whereby the materials are excluded from the hood and therefore are prevented from coming into contact with the steady bearing.

14 Claims, 4 Drawing Sheets

MIXER APPARATUS HAVING AN IMPROVED STEADY BEARING

DESCRIPTION

The present invention relates to mixer apparatus, and particularly to mixer apparatus having a long mixer shaft in a vessel with a steady bearing at the non-driven end thereof, where the steady bearing has means for preventing contact between the bearing and the materials being mixed.

The invention is especially suitable for use in vessels having large height-to-diameter ratios, such as some fermentation vessels. A mixer shaft in such a vessel can have a plurality of impellers and can extend to near the bottom of the vessel, being constrained at the lower or distal end by a bearing, known as a "steady bearing."

One type of steady bearing is disclosed, for example, in U.S. Pat. No. 4,932,787 to Fasano, issued Jun. 12, 1990. The Fasano steady bearing is a simple journalled bearing comprising a wear sleeve on a mixer shaft which runs in a bushing and is lubricated by the materials being mixed. A journalled bearing operating in contact with the materials being mixed has significant disadvantages. If the materials are not inherently lubricating, or the bearing components swell or change shape with use, the bearing can wear rapidly and require frequent changing, and can shed bearing particles which can contaminate the materials being mixed. Also, clearance between the journalled bearing surfaces is an area of high shear. Some materials such as some fermentation materials can be damaged or otherwise adversely affected by high shear.

An improved steady bearing having rolling elements such as balls or cylinders is disclosed in U.S. Pat. No. 5,088,832 to Gambrill et al., issued Feb. 18, 1992. Although much improved for wear life over a journalled steady bearing, the roller bearing proposed by Gambrill still must run in contact with the materials being mixed and can still be unsuitable, therefore, for mixing shear-sensitive materials. Further, harsh or aggressive materials can cause bearing materials to wear quickly, reducing run time and requiring high maintenance.

Accordingly, it is a principal object of the present invention to provide improved mixer apparatus having features of design and construction providing solutions to the foregoing problems and obviating the above-discussed disadvantages.

It is a further object of the present invention to provide an improved steady bearing having a trap whereby the bearing surfaces are protected from contact with the materials being mixed.

It is a still further object of the present invention to provide an improved steady bearing which provides isolation from the materials being mixed without resort to mechanical or rotating seals.

It is a still further object of the present invention to provide an improved steady bearing which does not require frequent disassembly, cleaning, or maintenance.

It is a still further object of the present invention to provide an improved steady bearing which does not require lubrication of the bearings.

It is a still further object of the present invention to provide an improved steady bearing which is suitable for use in mixing shear-sensitive materials.

It is a still further object of the present invention to provide an improved steady bearing whereby existing mixers having previous-design steady bearings can be easily retro-fitted.

Briefly described, mixer apparatus embodying the invention can have a mixer shaft extending into a vessel sufficiently far that the distal end of the shaft is beneficially constrained in a vessel-mounted steady bearing which prevents whipping or runout of the mixer shaft during mixing. A trap is provided to prevent contact of the materials being mixed with the steady bearing, comprising the mixer shaft, a bearing holder mounted on an inner wall of the vessel preferably near the bottom of the vessel, a hood disposed on the mixer shaft and defining a cavity in which the bearing holder is disposed, a steady bearing disposed on the bearing holder in the cavity, and means for providing a fluid, preferably a gas, into the cavity under pressure sufficient to exclude the materials being mixed from the cavity. The bearings have rolling elements requiring no lubrication, preferably having a ceramic such as, for example, silicon nitride, on at least the bearing surfaces. Such bearings are disclosed in, for example, U.S. Pat. No. 4,770,549 to Rokkaku et al., issued Sep. 13, 1988, and U.S. Pat. No. 4,997,296 to Narita et al., issued Mar. 5, 1991.

A method is also provided for preventing contact between a steady bearing disposed on a mixer shaft in a vessel and materials being mixed in the vessel. A hood is provided which is disposed on and rotatable with the mixer shaft, the hood being closed at the top and open at the bottom to the interior of the vessel to define a cavity in which the steady bearing is disposed. A fluid is provided into the cavity under pressure equal to or greater than the ambient hydrostatic pressure outside the hood, whereby materials being mixed are prevented from entering the hood and making contact with the steady bearing.

The foregoing and other objects, features, and advantages of the present invention, as well as specific examples of embodiments of the invention, will become more apparent from a reading of the following description in connection with the accompanying drawings in which.

Figure 1:
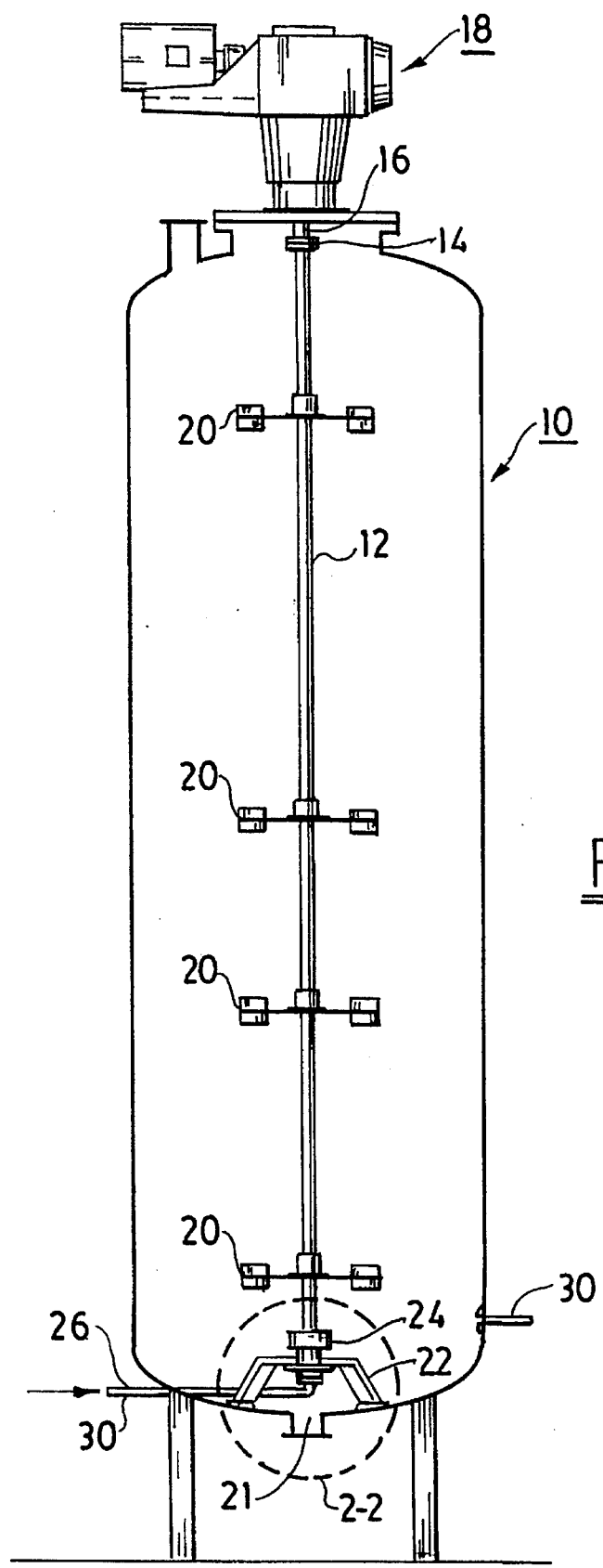
FIG. 1 is an elevational view partially in cross-section of a mixing vessel embodying the invention.

Referring more particularly to FIG. 1, there is shown a vessel 10 having a large height-to-diameter ratio. A mixer shaft 12 is connected at its upper end via coupling 14 to the output drive shaft 16 of mixer drive unit 18 which supports shaft 12 axially. Impellers 20 are disposed at intervals along shaft 12. Vessel outlet 21 is located at the bottom of vessel 10. Near the bottom of vessel 10 is a bracket 22 secured to the inner wall of vessel 10 and supporting a steady bearing and trap 24 in accordance with the invention. The cavity within trap 24 can be supplied with pressurized fluid from a source (not shown) via conduit 26 which mates with a bore 28 through plate 38. Pressure sensor 30 disposed in the inner wall of vessel 10 senses the ambient hydrostatic pressure in the vessel at a depth equal to the depth of trap 24 and provides a signal to control means (not shown) which automatically adjusts the flow of fluid through conduit 26 into trap 24 until the back pressure of the fluid sensed by sensor 32 in fluid supply conduit 26 at least equals the pressure sensed by sensor 30. Suitable automatic flow control means are well known to those skilled in the art. Alternatively, fluid flow can be set by a human operator without automated assist by using visual signals such as fluid escaping from trap 24. Flow can be adjusted during mixing to maintain the desired relationship in response to changes in hydrostatic pressure which can result from, for example, addition or subtraction of materials to or from the vessel. Preferably, the fluid selected is a gas such as, for example, air, nitrogen, or helium, although a liquid such as, for example, water, may also be used in accordance with the invention.

To prevent materials from entering and fouling the trap while the vessel is being filled, before a mixing run is begun, it is preferable that the trap-forming fluid be allowed to flow to excess through the trap during this time. Similarly, purging of the trap with fluid preferably is continued while the vessel is being drained at the conclusion of a mixing run.

Figure 2:
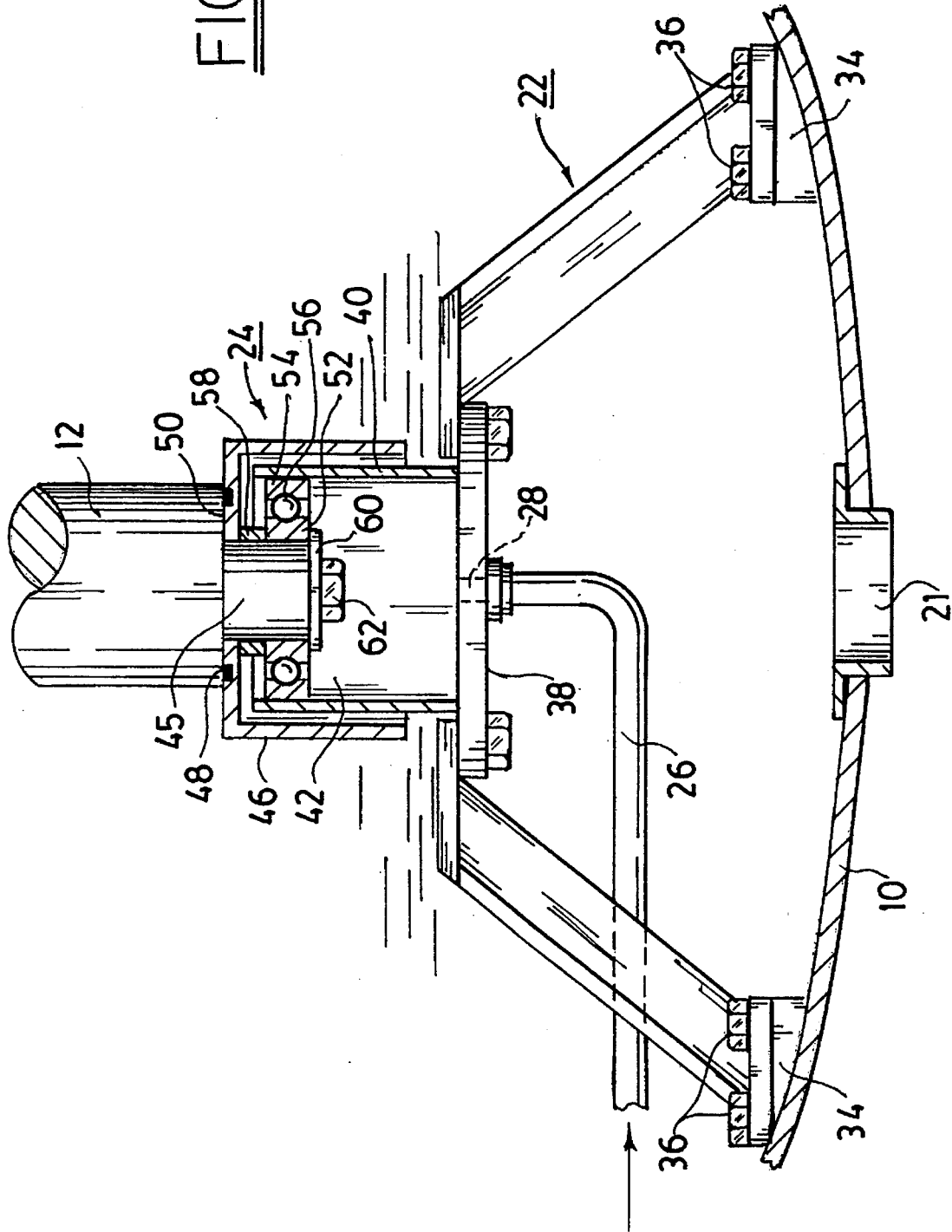
FIG. 2 is an enlarged and detailed elevational view partially in cross-section of an embodiment of a steady bearing and trap in accordance with the invention, taken from area 2—2 in FIG. 1.

In FIG. 2 is shown an enlarged and detailed view of the area 2—2 in FIG. 1. Pads 34 are fixed as by welding to the inner surface of vessel 10 and are provided with bores threaded to receive bolts. Bracket 22 is bolted to pads 34 by bolts 36 coaxial with mixer shaft 12. Plate 38 is bolted to bracket 22 and supports a stationary bearing holder 40 having an axial bore 42, holder 40 being mounted on plate 38 as by welding coaxial with mixer shaft 12. Conduit 26 is fixed as by threaded fittings to plate 38 and mates with bore 28 through plate 38, whereby pressurized fluid can be admitted to axial bore 42.

Mixer shaft 12 has a reduced diameter portion 45 near its distal end. A hood 46 having an axial opening therethrough is fitted sealingly via O-ring 48 to the step 50 and portion 45 in shaft 12. A ball bearing assembly having inner race 52, outer race 54, and balls 56 is fitted over portion 45, the axial position of inner race 52 being set by annular spacer 58. The hood, spacer, and bearing assembly are assembled to shaft 12 by retainer 60 and bolt 62. The nominal length of shaft 12 is chosen such that the ball bearing assembly is positioned within and near the top of bearing holder 40. Outer race 54 fits snugly within holder 40 but can float axially as needed to accommodate, for example, thermally-induced dimensional changes in the length of shaft 12.

Bearings are preferably ceramic on at least their outer surfaces, as described above, and are suited particularly to running without need for surface lubrication by either the materials being mixed or the trap-forming fluid introduced via conduit 26. Preferably, the bearings control only the radial runout of shaft 12, the shaft being axially supported by drive unit 18. Alternatively, the trap and bearings can be designed to provide both axial and radial control of shaft 12.

Hood 46 defines a cavity within which the spacer, bearing assembly, retainer, bolt, and stationary bearing holder are disposed. Hood 46 is coaxially disposed on mixer shaft 12 and is spaced from bearing holder 40 both radially and axially. Preferably, fluid pressure is created within the cavity such that the entire cavity is filled with trap-forming fluid and is free of materials being mixed. At a minimum, the axial bore 42 in bearing holder 40, which is the bearing chamber, must be kept free of material. Typically, pressurizing fluid flow is set such that a small amount of fluid escapes continuously from the lower periphery of hood 46, thereby assuring that the materials/fluid interface is at that point. The bearing assembly is freely porous to the trap-forming pressurizing fluid whereby the fluid can fill the cavity in hood 46 and exclude all materials being mixed therefrom.

Figure 3:
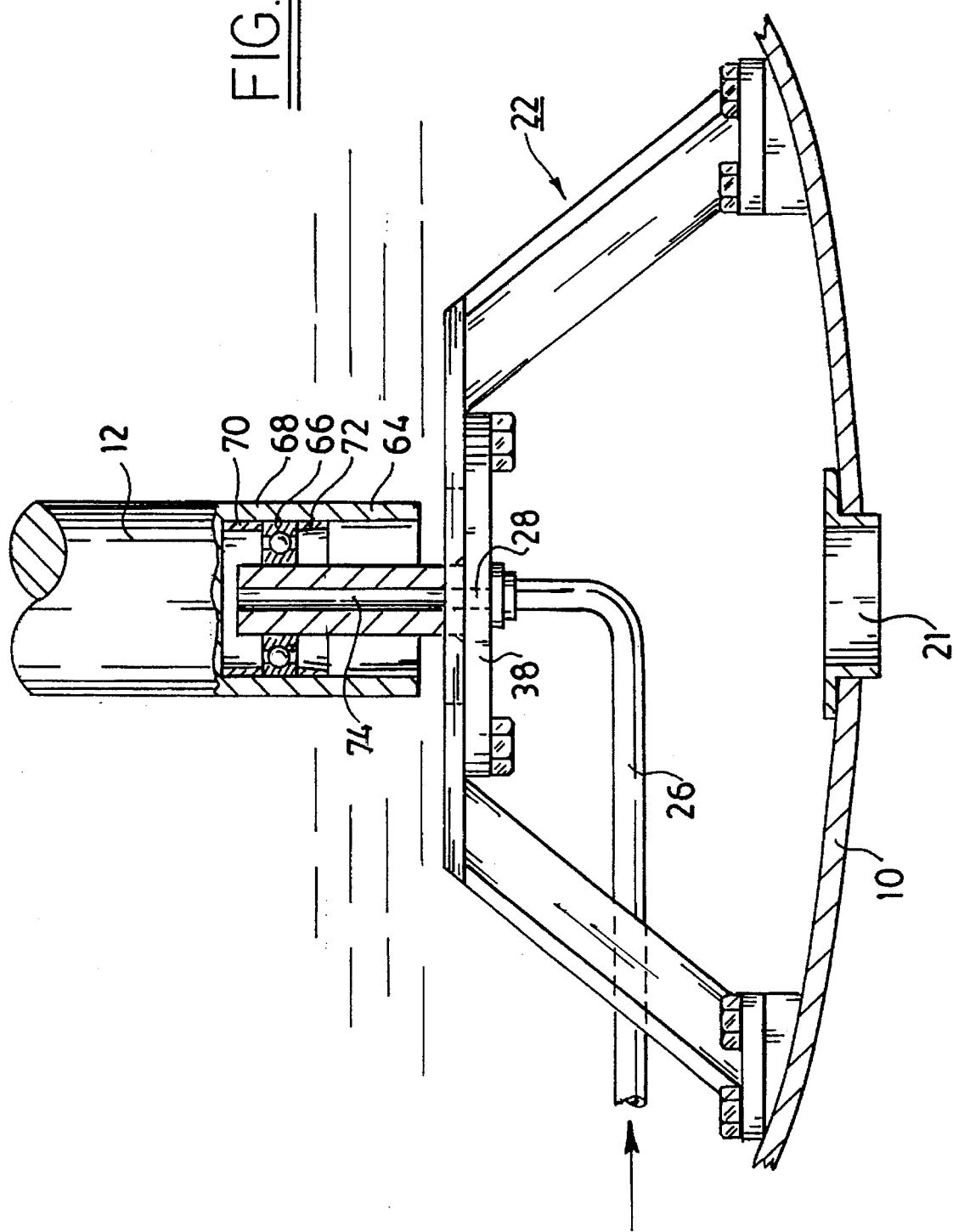
FIG. 3 is a view like FIG. 2 of another embodiment in accordance with the invention.

FIG. 3 shows another embodiment in accordance with the invention. Stationary bearing holder 64 is a stub shaft mounted as by welding on plate 38. Bearing assembly 66 is disposed within hood 68, with axial positioning set by spacer 70, and being retained within hood 68 by pressed retaining ring 72. In this embodiment, the outer bearing race is disposed on the mixer shaft, the inner bearing race on the stationary bearing holder, the reverse of the relationship shown in the embodiment of FIG. 2. Bearing holder 64 is provided with an axial bore 74 which mates with bore 28 in plate 38, allowing pressurized trap-forming fluid to enter the cavity within hood 68.

Figure 4:
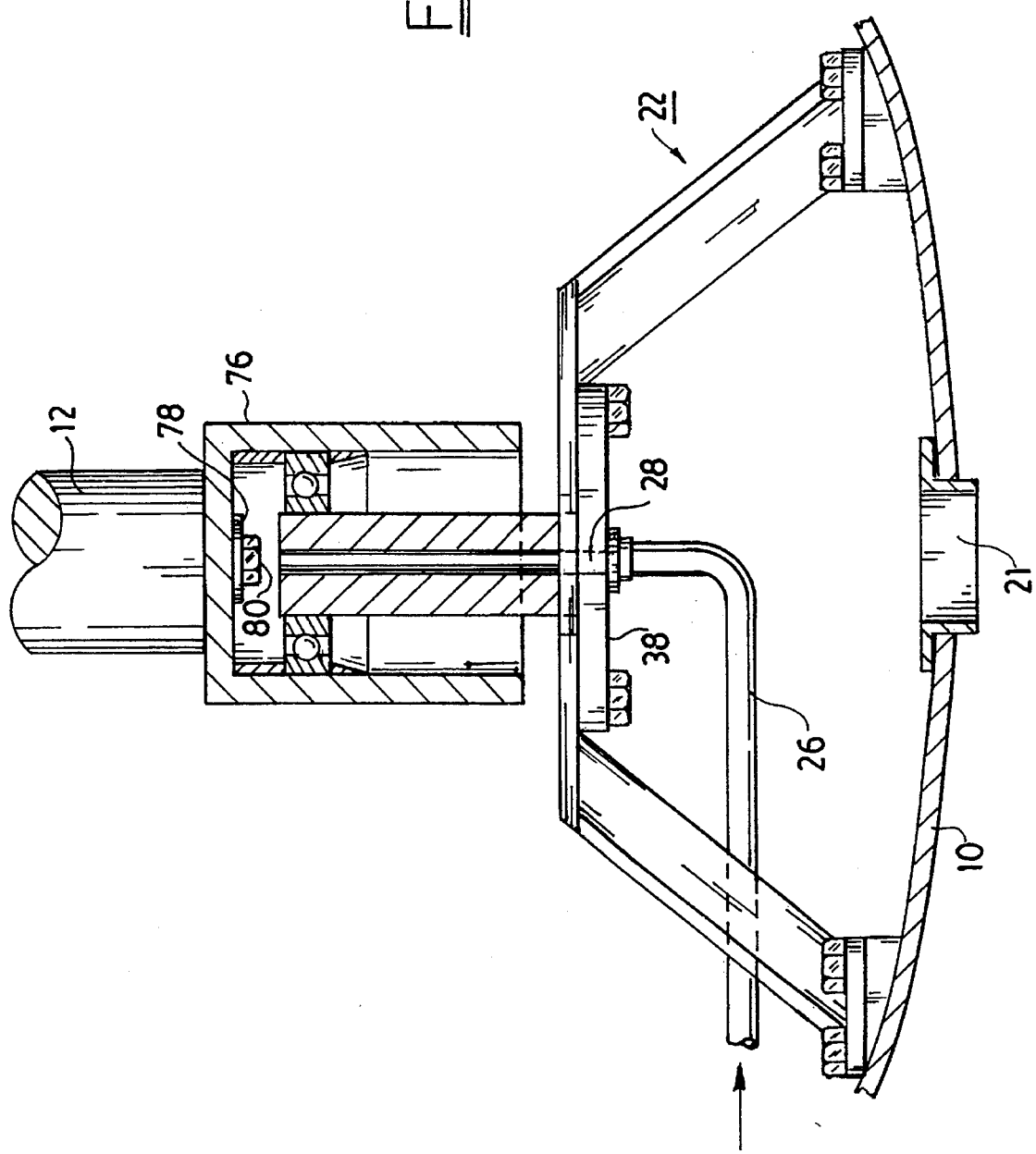
FIG. 4 is a view like FIG. 2 of still another embodiment in accordance with the invention.

If a larger, more rugged steady bearing is desired without increasing the diameter of the mixer shaft, the diameters of the hood, bearing assembly, and bearing holder can be increased, as shown in FIG. 4. In FIG. 3, hood 68 is shown as being integral with mixer shaft 12. In FIG. 4, hood 76 is formed separately, like hood 46 in FIG. 2, and is attached to shaft 12 by washer 78 and bolt 80. Otherwise, the structure and operation of the embodiment shown in FIG. 4 is the same as that of FIG. 3.

The three embodiments shown in FIGS. 2–4 all have substantially cylindrical cavity portions between the hood and the bearing holder. A cylindrical cavity shape is generally preferred, although other shapes such as, for example, conical or trapezoidal may be preferable in particular mixing applications.

From the foregoing description, it will be apparent that there has been provided an improved mixer having a long, distally-constrained mixer shaft and particularly an improved dry-running steady bearing therefor. While several embodiments have been described, variations and modifications thereof, within the scope of the invention, will undoubtedly suggest themselves to those persons skilled in the art. Accordingly, the foregoing description should be taken as illustrative and not in the limiting sense.

What is claimed is:

1. A mixer apparatus having a vessel for mixing materials, and a mixer shaft connected to a drive near one end of such shaft and being subject to deflection away from said one end; a steady bearing having a trap for preventing contact between the steady bearing and the materials being mixed, said steady bearing comprising:

a) A bearing holder dispose within said vessel coaxially with said mixer shaft, said bearing holder being fixed to said vessel and being spaced from said shaft where it is subject to deflection;

b) A hood defining a cavity, said hood being coaxially disposed on said mixer shaft radially and axially spaced from said bearing holder which is disposed coaxially in said cavity;

c) A bearing in said cavity having a stationary portion and a rotatable portion, said bearing being connected to one of said hood and said shaft and to said bearing holder thereby permitting said shaft to turn while counteracting deflection thereof; and d) Means for providing a fluid into said cavity under pressure sufficient to exclude said materials from said cavity.

2. A steady bearing in accordance with claim 1 wherein said bearing holder has an axial bore therein, said mixer shaft is disposed within said axial bore, and said bearing is disposed between and connected to said mixer shaft and said axial bore in said bearing holder.

3. A steady bearing in accordance with claim 1 wherein said fluid is a gas.

4. A steady bearing in accordance with claim 1 wherein said fluid is a liquid.

5. A steady bearing in accordance with claim 1 further comprising rolling bearing elements between said first and second bearing portions.

6. A steady bearing in accordance with claim 5 wherein said rolling bearing elements are spherical.

7. A steady bearing in accordance with claim 5 wherein said rolling elements are cylindrical.

8. A steady bearing in accordance with claim 5 wherein said rolling bearing elements are dry-running.

9. A steady bearing in accordance with claim 8 wherein at least the surfaces of said dry-running bearing elements are formed of a ceramic.

10. The steady bearing according to claim 1 wherein said hood is a cylindrical tube extending from the shaft, said tube being substantially the same diameter shaft.

11. The steady bearing according to claim 1 further comprising a base plate mounted to the vessel at the bottom thereof, a member coaxial with said shaft on said base plate and extending upwardly therefrom to define said bearing holder.

12. The bearing assembly according to claim 11 wherein said bearing holder is coaxial with said shaft which has lower and upper ends on said base plate and extending above said bearing respectively, and a base through said member to said upper end providing a passage for said fluid.

13. The bearing assembly according to claim 12 wherein said hood is a tube having a diameter greater than the diameter of said shaft.

14. A method for preventing contact between a steady bearing disposed on a mixer shaft in a vessel and materials being mixed in said vessel, comprising the steps of:

a) providing a hood disposed on and rotatable with said mixer shaft, said hood being closed at the top and open at the bottom to the interior of said vessel to define a cavity in which said steady bearing is disposed; and b) providing a fluid into said cavity under a pressure at least equal to the ambient hydrostatic pressure outside said hood.

* * * * *